(12) United States Patent
Jee

(10) Patent No.: US 8,264,107 B2
(45) Date of Patent: Sep. 11, 2012

(54) AFPM CORELESS MULTI-GENERATOR AND MOTOR

(76) Inventor: In-Ho Jee, Bucheon (KR)

( * ) Notice: Subject to any disclaimer, the term of this patent is extended or adjusted under 35 U.S.C. 154(b) by 184 days.

(21) Appl. No.: 12/522,169

(22) PCT Filed: Apr. 4, 2007

(86) PCT No.: PCT/KR2007/001652
§ 371 (c)(1),
(2), (4) Date: Jul. 3, 2009

(87) PCT Pub. No.: WO2008/091035
PCT Pub. Date: Jul. 31, 2008

(65) Prior Publication Data
US 2009/0309430 A1 Dec. 17, 2009

(30) Foreign Application Priority Data
Jan. 25, 2007 (KR) .......................... 10-2007-0007821

(51) Int. Cl.
*H02K 9/00* (2006.01)
*H02K 1/22* (2006.01)
(52) U.S. Cl. .......................................... 310/54; 310/268
(58) Field of Classification Search .................... 310/52, 310/54, 57, 266, 268
See application file for complete search history.

(56) References Cited

U.S. PATENT DOCUMENTS

| 4,508,998 A | | 4/1985 | Hahn | |
| 5,581,135 A | * | 12/1996 | Ito et al. | 310/52 |
| 5,945,766 A | * | 8/1999 | Kim et al. | 310/268 |
| 5,982,074 A | * | 11/1999 | Smith et al. | 310/254.1 |

(Continued)

FOREIGN PATENT DOCUMENTS

KR 10-1997-0060643 A 8/1997

(Continued)

OTHER PUBLICATIONS

International Search Report of PCT/KR2007/001652.

*Primary Examiner* — Quyen Leung
*Assistant Examiner* — Thomas Truong
(74) *Attorney, Agent, or Firm* — Kile Park Goekjian Reed & McManus PLLC

(57) ABSTRACT

The present invention relates to an AFPM coreless multi-generator and motor. The present invention is characterized in that the stator includes coils arranged between upper and lower jig plates made of a non-magnetic material, cooling insulating oil is filled in a space where the coils are mounted between the upper and lower jig plates and is sealed by both lateral plates, and one of the both lateral plates is fixedly coupled to the housing of the generator so as to allow the housing to perform thermal conduction. Also, the rotor includes magnets arranged on a rotor disc in a circular arc shape and a yoke element formed integrally with the rotor disc near a central portion thereof in such a fashion as to vertically protrude by a predetermined height. The rotor disc is fixedly mounted to the rotary shaft, and the yoke element is engaged with a yoke element of another rotor correspondingly adjacent to the rotor so as to allow the engaged yoke elements to serve as a passageway of a magnetic field. The rotor and stator are configured in a multi-structure. The present invention can be applied to a motor having the same structure as that of the generator.

3 Claims, 1 Drawing Sheet

U.S. PATENT DOCUMENTS

| | | | | |
|---|---|---|---|---|
| 6,118,202 | A | * | 9/2000 | Pinkerton ..................... 310/178 |
| 6,304,011 | B1 | * | 10/2001 | Pullen et al. ..................... 310/52 |
| 7,598,647 | B2 | * | 10/2009 | Okazaki et al. ............... 310/171 |
| 7,821,169 | B2 | * | 10/2010 | Okazaki et al. .......... 310/156.36 |
| 7,872,393 | B2 | * | 1/2011 | Okazaki et al. ............... 310/268 |
| 2001/0015937 | A1 | * | 8/2001 | Yamaguchi et al. ............ 369/13 |

FOREIGN PATENT DOCUMENTS

| | | |
|---|---|---|
| KR | 10-2003-0057835 A | 7/2003 |
| WO | WO 2006068042 A1 * | 6/2006 |

* cited by examiner

[Fig. 1]
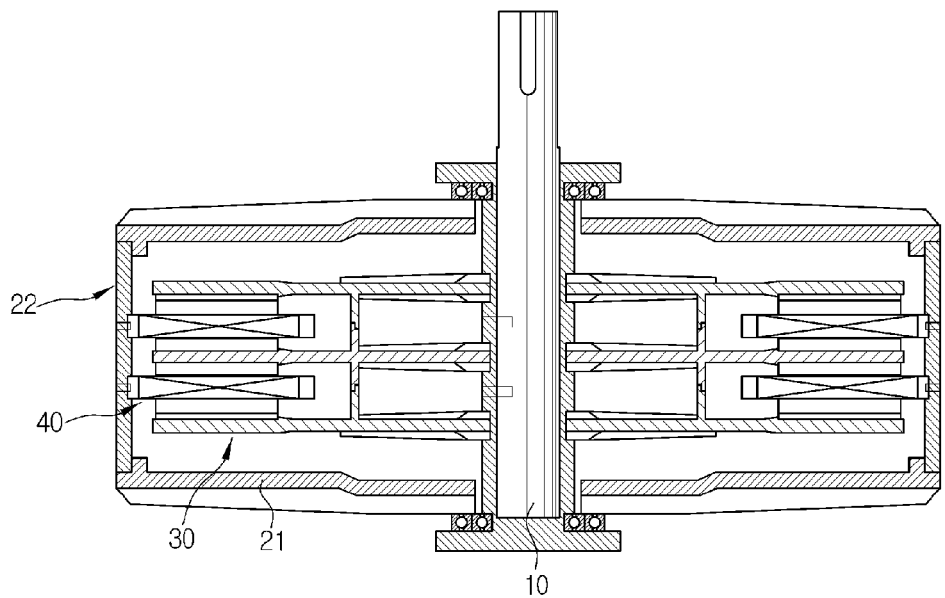
[Fig. 2]
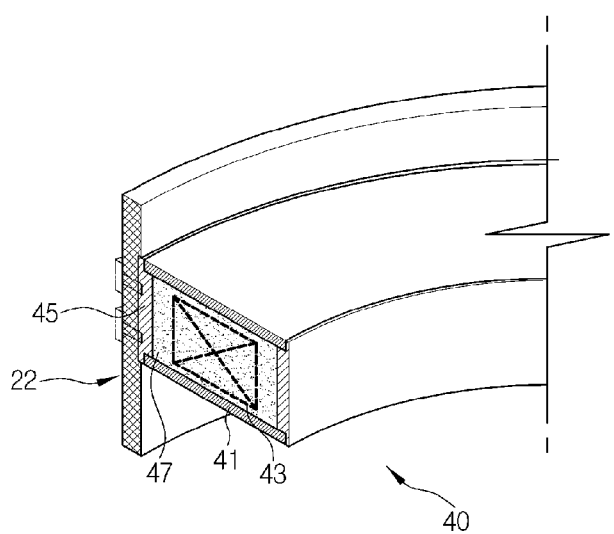
[Fig. 3]
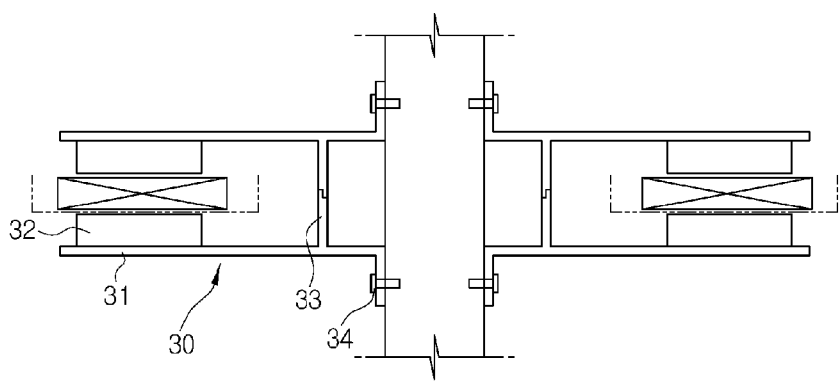

AFPM CORELESS MULTI-GENERATOR AND MOTOR

TECHNICAL FIELD

The present invention relates to an axial-flux-permanent magnet (hereinafter, referred to as "AFPM") coreless multi-generator and motor, and more particularly, to an AFPM coreless multi-generator and motor in which heat generated from coils is conducted to a stator plate by using cooling insulating oil and the heat of the stator plate is conducted to a housing to thereby radiate heat in a multi-rotor and multi-stator structure.

BACKGROUND ART

In general, a generator includes a rotor and a stator wherein the rotor has a plurality of magnets arranged on a rotor disc in such a fashion as to be fixedly mounted to a rotary shaft, and the stator is mounted spaced apart from the rotor, coils from which voltage is induced by a line of magnetic force generated by the rotation of the rotor are arranged on a stator disc, the stator being fixedly mounted to a lateral housing. Such a basic structure of the generator is intended to output the power induced to coils of the stator through an external rotary power transmitted to the rotary shaft.

However, the rotary shaft rotates by an external rotational force to cause the rotor to rotate, and a magnetic field induced by magnets mounted on the rotor is inducted to coils of the stator to thereby produce the power from the coils. At this time, the coils of the stator induce the power and generate heat by the induced magnetic field.

DISCLOSURE OF INVENTION

Technical Problem

Windings used in a conventional generator are configured such that coils are arranged on the stator disc depending on the number of magnetic poles and molded with an insulating resin. Thus, heat generated from the windings is radiated to the outside through the molded resin. Nevertheless, since the molded resin has a low thermal conductivity, a heat radiation effect is deteriorated. This does not cause a big problem in a small-sized generator, but as the power increases, the amount of heat generated also increases to thereby adversely affect the generator.

A conventional very large generator has a water-cooling type radiation structure mounted on the outer periphery of the stator installed with windings as a separate heat radiation means, or employs a structure which is adapted to wind a cooling pipe along with windings so as to cool the windings themselves. Such a radiation structure can be applied to the very large generator, but cannot be applied to a general industrial motor of 10 KW class to 50 KW class. A typical industrial generator does not employ a separate heat radiation structure, but merely employs has a blast fan mounted externally from generator or an external radiation structure. Particularly, in case of a coreless stator, there is not any heat radiation structure, and hence a problem associated with generation of heat is caused greatly.

In addition, in case of a motor that supplies current to coils to cause the rotary shaft to output a rotary power with the same construction as that of a generator, there has occurred a problem in that the heat radiation performance of the coils mounted in the stator is degraded.

Technical Solution

Accordingly, the present invention has been made in view of the aforementioned problems occurring in the prior art, and it is an object of the present invention to provide an AFPM coreless generator employing a heat radiation structure which transfers heat generated from windings to the outer surface of a stator to radiate the heat.

Another object of the present invention is to provide an AFPM coreless generator employing the above heat radiation structure, which includes a stator and a rotor configured in a multi-structure to thereby produce a high power.

Yet another object of the present invention is to provide an AFPM coreless generator in which a yoke for transmitting a magnetic force of a rotor is formed in an integral structure in upper and lower rotor discs, and leakage magnetic flux is reduced at the time of assembling of the upper and lower rotor discs, thereby improving efficiency.

Further object of the present invention is to provide an AFPM coreless multi-motor having the same structure as that of the AFPM coreless generator.

Advantageous Effects

According to the AFPM coreless multi-generator and motor of present invention, heat generated from coils of a stator is conducted to a housing via a stator jig plate by using cooling insulating oil to thereby radiate heat to prevent a degradation in efficiency.

The present invention permits a yoke structure of a rotor to be integrally formed with a rotor disc to thereby make the assembly work and process simple and to prevent leakage magnetic flux generated at a coupling portion at the time of formation of a passageway of a magnetic field to promote the performance improvement.

In addition, a rotor and a stator are arranged in a multi-structure so that a high power can be obtained in a small generator.

BRIEF DESCRIPTION OF THE DRAWINGS

FIG. 1 is a cross-sectional view illustrating an AFPM coreless multi-generator according to the present invention;

FIG. 2 is a partial perspective view illustrating essential elements of a stator of an AFPM coreless multi-generator according to the present invention; and FIG. 3 is a cross-sectional view illustrating a yoke structure of a rotor of an AFPM coreless multi-generator according to the present invention.

BEST MODE FOR CARRYING OUT THE INVENTION

To achieve the above object, the present invention provides an AFPM coreless multi-generator comprising: a rotor fixedly mounted to a rotary shaft to rotate together with the rotary shaft and having magnets arranged therein; and a stator fixedly mounted to a lateral housing and having coils arranged therein, wherein the stator includes coils arranged between upper and lower jig plates made of a non-magnetic material, cooling insulating oil is filled in a space where the coils are mounted between the upper and lower jig plates and is sealed by both lateral plates, and one of the both lateral plates is fixedly coupled to the housing of the generator so as to allow the housing to perform thermal conduction. In this case, instead of the cooling insulating oil, inert gas may be filled in the space where the coils are mounted between the upper and lower jig plates and may be sealed.

Also, the rotor includes magnets arranged on a rotor disc in a circular arc shape and a yoke element formed integrally with the rotor disc near a central portion thereof in such a fashion as to vertically protrude by a predetermined height. The rotor disc is fixedly mounted to the rotary shaft, and the yoke element is engaged with a yoke element of another rotor correspondingly adjacent to the rotor so as to allow the engaged yoke elements to serve as a passageway of a magnetic field.

The stator is mounted between upper and lower rotor discs adjacent to each other, and wherein upper and lower yoke elements are formed integrally with the upper and lower rotor discs, respectively, in such a fashion as to be spaced apart from the stator and confronting ends of the upper and lower yoke elements are machined [s] with a general "S" configuration so as to allow the upper and lower yoke elements to be engaged with each other.

In addition, the AFPM coreless multi-generator further comprises a plurality of heat radiation plates attached to the outer circumferential surface of the lateral housing.

Furthermore, the present invention provides an AFPM coreless multi-motor having the same structure as that of the AFPM coreless multi-generator.

Mode for the Invention

Hereinafter, the preferred embodiment of the present invention will be described in detail with reference to the appended drawings.

FIG. 1 is a cross-sectional view illustrating an AFPM coreless multi-generator according to the present invention.

As shown in FIG. 1, a rotor 30 is fixedly mounted to a rotary shaft 10 to rotate together with the rotary shaft, and a stator 40 is mounted spaced apart from the rotor 30 and is fixedly mounted to a lateral housing 22. Upper and lower housings 21 are rotatably mounted to the rotary shaft 10 by means of a bearing. The rotor 30 includes magnets arranged on a rotor disc in a circular arc shape, and the stator 40 includes coils arranged on a disc-like stator jig to correspond to the magnets of the rotor 30.

Each of the rotor 30 and the stator 40 is configured in a multi-rotor and multi-stator structure that it is mounted in at least two stages.

FIG. 2 is a partial perspective view illustrating essential elements of a stator of an AFPM coreless multi-generator according to the present invention.

The stator 40 includes coils 43 arranged between upper and lower jig plates 41 made of a non-magnetic material. Cooling insulating oil 47 is filled in a space where the coils 43 are mounted between the upper and lower jig plates 41 and is sealed by both lateral plates 45. One of the both lateral plates 45 is fixedly screw-coupled to a lateral housing 22 of the generator so as to allow the lateral housing 22 to perform thermal conduction. Instead of the cooling insulating, oil inert gas may be sealingly filled in the space where the coils 43 are mounted between the upper and lower jig plates 41.

An AFPM coreless generator including a rotor fixedly mounted to a rotary shaft to rotate together with the rotary shaft and having magnets arranged therein; and a stator fixedly mounted to a lateral housing and having coils arranged therein, wherein the stator includes coils arranged between upper and lower jig plates made of a non-magnetic material, inert gas or cooling insulating oil is filled in a space where the coils are mounted between the upper and lower jig plates and is sealed by both lateral plates, and one of the both lateral plates is fixedly coupled to the housing of the generator so as to allow the housing to perform thermal conduction.

FIG. 3 is a cross-sectional view illustrating a yoke structure of a rotor of an AFPM coreless multi-generator according to the present invention.

The rotor 30 according to the present invention includes magnets 32 arranged on a rotor disc 30 in a circular arc shape and a yoke element formed integrally with the rotor disc near a central portion thereof in such a fashion as to vertically protrude by a predetermined height. The rotor disc is fixedly mounted to the rotary shaft, and the yoke element 33 is engaged with a yoke element of another rotor correspondingly adjacent to the rotor so as to allow the engaged yoke elements to serve as a passageway of a magnetic field. That is, the rotor disc 31 and the yoke element feature that they are integrally formed with each other.

The stator 40 is mounted between the upper and lower rotor discs 31, and upper and lower yoke elements 33 are formed integrally with the upper and lower rotor discs 31, respectively, in such a fashion as to be spaced apart from the stator 40 and are engaged with each other.

As shown in FIG. 3, the engagement between the upper and lower yoke elements 33 may be performed in such a fashion that confronting ends of the upper and lower yoke elements 33 are steppedly machined to correspond to each other so as to allow upper and lower yoke elements to be engaged with each other. Also, the engagement between the upper and lower yoke elements 33 may be performed in such a fashion that one of the confronting ends of the upper and lower yoke elements 33 is formed with a groove and the other of the confronting ends of the upper and lower yoke elements 33 is formed with a fitting protrusion to be tightly fit into the groove so as to allow the upper and lower yoke elements 33 to be engaged with each other.

The above construction of the invention has been described an example of the case where the yoke element 33 is formed integrally with the rotor disc 31 of the rotor 30, but the yoke element 33 and the rotor disc 31 may be constructed to be separately screw-coupled to each other.

The AFPM coreless generator employs a structure of the stator 40 that does not use a core for winding the coils 43 therearound. The upper and lower jig plates 41 are formed of a non-magnetic material (for example, brass) and the coils 43 are arranged in an arc shape between the upper and lower jig plates 41. The coils 43 are typically wound in an oval shape. At this time, an upper jig plate is disposed on the coils 43 adhered to a lower jig plate. In this case, both lateral plates 45 define a space to mount the coils to have a predetermined space portion. A space between the lateral plates 45 and the upper and lower jig plates 41 is hermetically sealed in a sealing structure using oil, etc., although not being shown in drawings. An injection port for the cooling insulating oil 47 is formed in any position of the lateral plates 41 so that the cooling insulating oil 47 is injected into the space between the lateral plates 45 and the upper and lower jig plates 41 through the injection port and then the injection port is tightly sealed. The injection of the cooling insulating oil 47 is aimed to radiate heat generated from the coils 43. Then, the lateral plates of the stator 40 fixedly screw-coupled to a lateral housing 22 of the generator in such a fashion that a lateral side of the stator 40 is insertedly coupled to concave grooves formed on the lateral housing.

The rotor 30 is constructed such that the yoke element 33 is integrally formed with the rotor disc 31 made of a magnetic material, and includes magnets arranged on a rotor disc in an arc shape. The rotor disc 31 is formed with a coupling portion to be screw-coupled to the rotary shaft 10.

After the mounting of the rotor 30, the stator 40 is coupled to the rotor and a rotor 30 is re-mounted to the rotary shaft. In this case, a rotor 30 positioned in the middle of a series of rotors has magnets mounted on the top and bottom surface thereof, and yoke elements are integrally formed with the top and bottom surfaces of the rotor. The upper and lower housings 21 of the rotor 30 are rotatably mounted to the rotary shaft 10.

The rotor 30 and the stator 40 are arranged in at least one or more pairs in a multi-rotor and stator structure. When an external rotational force is transferred to the rotary shaft 10, the rotors 30 fixedly mounted to the rotary shaft 10 rotate and induced current flows in the coils of the stators 40 by means of a magnetic force generated by the rotation of the rotors to generate current from the coils 43 to thereby operate the generator.

At this time, as the coils 43 induces current, heat is generated from the coils. The heat generated from the coils 43 is transferred to the cooling insulating coil 47 so that heat is conducted uniformly to the upper and lower jig plates and the lateral plates and then conducted to the lateral housing as it is. Thus, the entire housing functions as a heat radiation plate.

Therefore, if heat radiation plates (not shown) are attached to the outer circumferential surface of the lateral housing 22 so as to increase a heat radiation effect, heat generated from coils can be further effectively radiated.

As such, in the present invention, the heat generated from the coils 43 of the stator 40 is effectively transferred to the lateral housing 22 to thereby radiate the heat by ambient air.

INDUSTRIAL APPLICABILITY

As described above, the AFPM coreless generator according to the present invention can be applied to both a small-capacity generator and a relatively large-capacity wind power generator of 10 KW class to 50 KW class.

In addition, the inventive AFPM coreless generator can obtain a high power through a multi-rotor and stator structure despite the use of a small construction, and employs an efficient heat radiation structure to prevent deterioration or performance degradation due to heat.

In the meantime, the present invention has been described with reference to a specific embodiment of structure of a generator, but may be used in a motor having the same structure as that of the generator. In case where the structure of the present invention is used in the motor, when current is supplied to the coils 43 of the stator 40, the coils interact with the magnets of the rotor 30 by means of an induced magnetic field to rotate the rotor 30 to cause a rotational force to be transferred to the rotary shaft.

The present invention can be applied to a generator as well as a motor.

The invention claimed is:

1. An AFPM coreless multi-generator and motor with enhanced stator heat dissipation comprising:
    an enclosed generally cylindrical metallic housing, said housing having a plurality of peripheral channels fashioned within a lateral interior surface of and axially spaced along said closed generally cylindrical housing;
    a rotary shaft axially mounted within said enclosed generally cylindrical metallic housing and being journaled within bearings mounted at axial ends of said enclosed generally cylindrical metallic housing;
    a plurality of axially spaced rotor discs mounted upon said rotary shaft and being operable for rotation with said rotary shaft and having permanent magnets arranged on said rotor discs in a generally circular arc shape and a yoke element formed integrally with each rotor disc near but radially spaced from a central portion thereof and said rotary shaft to axially extend by a predetermined length wherein yoke elements of rotors engage with a yoke element of an adjacent rotor so as to allow the engaged elements to serve as a passageway for a magnetic field; and
    a plurality of stators mounted within and upon said enclosed generally cylindrical housing and being alternatively spaced with respect to said plurality of rotors, said stators having spaced metallic, non-magnetic, arcuate jig plates and arcuate, non-magnetic radially inner and outer lateral side plates, said spaced metallic jig plates and said radially inner and outer side plates forming hermetically sealed stator enclosures and coreless coils being arranged therein with the stator coils being arranged between said spaced jig plates and an oil filling said hermetically sealed stator enclosures and said radially outer lateral side plates being fitted with direct abutting, heat conducting, contact within said peripheral channels of said metallic housing said oil being operable for dissipating heat from said stator coils to said radially outer lateral side plates of said hermetically sealed stator enclosures and said plurality of interior peripheral channels axially spaced along said generally cylindrical metallic housing receiving said radially outer lateral side plates of said plurality of stators in direct heat exchange contact conducting heat from said hermetically sealed stator enclosures into said generally cylindrical metallic housing to dissipate heat away from said hermetically sealed stator enclosures and providing cooling for the AFPM coreless multi-generator and motor.

2. The AFPM coreless multi-generator and motor as defined in claim 1 wherein:
    yoke elements of adjacent rotors are machined with a general "S" configuration so as to allow the yoke element to be engaged with each other.

3. The AFPM coreless multi-generator and motor as defined in claim 1 wherein:
    said radially outer side plates of said stators are fixedly screw coupled within said peripheral channels of the lateral interior surface of said enclosed generally cylindrical metallic housing to facilitate conduction of heat between said outer side plates of said stators and said generally cylindrical metallic housing.

* * * * *